(12) United States Patent
Fournier et al.

(10) Patent No.: US 6,662,147 B1
(45) Date of Patent: Dec. 9, 2003

(54) METHOD ALLOWING TO OBTAIN AN OPTIMUM MODEL OF A PHYSICAL CHARACTERISTIC IN A HETEROGENEOUS MEDIUM SUCH AS THE SUBSOIL

(76) Inventors: Frédérique Fournier, 12bis, rue Carnot, 95240 Cormeills en Parisis (FR); Jean-Jacques Royer, 19 rue Beauregard, 54000 Nancy (FR)

( * ) Notice: Subject to any disclaimer, the term of this patent is extended or adjusted under 35 U.S.C. 154(b) by 0 days.

(21) Appl. No.: 09/548,431

(22) Filed: Apr. 12, 2000

(30) Foreign Application Priority Data

Apr. 16, 1999 (FR) .............................. 99 05288

(51) Int. Cl.⁷ .......................... G06F 7/60; G06F 15/00; G01V 5/00
(52) U.S. Cl. ............................. 703/10; 702/13; 367/73; 175/50
(58) Field of Search ..................... 703/2, 9, 10; 367/73; 175/50; 702/6, 7, 11, 13, 18

(56) References Cited

U.S. PATENT DOCUMENTS

| | | | | |
|---|---|---|---|---|
| 4,972,383 | A | * 11/1990 | Lailly | 367/73 |
| 5,321,613 | A | 6/1994 | Porter et al. | 702/1 |
| 5,416,750 | A | 5/1995 | Doyen et al. | 367/28 |
| 5,838,634 | A | * 11/1998 | Jones et al. | 367/73 |
| 6,302,221 | B1 | * 10/2001 | Hamman et al. | 175/50 |
| 6,374,201 | B1 | * 4/2002 | Grizon et al. | 703/10 |

FOREIGN PATENT DOCUMENTS

| | | | | |
|---|---|---|---|---|
| EP | 0889331 | 1/1999 | | G01V/1/30 |
| EP | 0911652 | 4/1999 | | G01V/11/00 |
| EP | 0923051 | 6/1999 | | C06T/7/40 |

OTHER PUBLICATIONS

May et al., E.A. A Hybrid System for Well Test Analysis, The 1998 IEEE Joint Conference on Neural Networks Proceedings, IEEE World Congress on Computational Intelligence, 1998, vol. 1, Apr. 1998, pp. 295–300.*

Tripp et al., A.C. Three–Dimensional Electromagnetic Cross–Well Inversion, IEEE Transactions on Geoscience and Remote Sensing, vol. 31, Issue 1, Jan. 1993, pp. 121–126.*

A. Berlioux: "Validation and Update of 3–D Velocity Models by Inversion of Seismic and Well–Log Data", available on Internet: http://sepwww.stanford.edu/public/docs/sep92/toc_html/, XP002126635, Dec. 22, 1999 (Abstract Only).

M.R. Inggs et al.: "Interpolating Satellite Derived Wind Field Data using Ordinary Kriging, with Application to the Nadir Gap", IEEE Transactions on Geoscience and Remote Sensing, US, IEEE Inc., New York, vol. 34, No. I, pp. 250–256, XP000588935 ISSN: 01996–2892.

* cited by examiner

*Primary Examiner*—Russell Frejd
(74) *Attorney, Agent, or Firm*—Antonelli, Terry, Stout & Kraus, LLP

(57) ABSTRACT

A method for obtaining, by means of an inversion process, an optimum model of a physical characteristic in a heterogeneous medium (the impedance of an underground zone in relation to waves transmitted in the ground for example), by taking as the starting point an a priori model of the physical characterized that is optimized by minimizing a cost function dependent on differences between the optimized model which is sought and the known data, considering the a priori model. Construction of the a priori model comprises correlation by kriging between values of the physical quantity known at different points of the medium along discontinuities (strata directions). Uncertainties about the values of the physical quantity in the a priori model in relation to the corresponding values in the medium follow a covariance model that controls the inversion parameters more quantitatively. The characteristics of the covariance model are defined in connection with the structure of the data observed or measured in the medium. An application of the optimum model is location of hydrocarbon reservoirs.

49 Claims, 3 Drawing Sheets

$\vec{h} = 3dx + 3dy$

Covariance (×10⁶)
- < 0.75
- 0.75-1.31
- 1.31-1.37
- 1.37-1.44
- 1.44-1.48
- 1.48-1.50
- >1.52

$\vec{h} = dx + 2dy$

METHOD ALLOWING TO OBTAIN AN OPTIMUM MODEL OF A PHYSICAL CHARACTERISTIC IN A HETEROGENEOUS MEDIUM SUCH AS THE SUBSOIL

BACKGROUND OF THE INVENTION

1. Field of the Invention

The present invention relates to a method for obtaining an optimum model of a physical characteristic in a heterogeneous medium.

2. Description of the Prior Art

It is well-known at the present time that the precision and reliability of a reservoir model greatly depends on an integration of compatible data of different natures, connected with the properties of a reservoir which has been studied. Many surveys have for example shown the part that can be played by seismic data for constraining an image of a reservoir in the spaces contained between the wells drilled therein.

A common strategy for integrating seismic data into a reservoir model estimates the acoustic or elastic impedances from the seismic amplitudes and in translating the impedances into reservoir properties.

Among the inversion algorithms, the techniques using an a priori model require selection of parameters that weigh the respective influences of the data and of the a priori model in the optimization.

U.S. Pat. No. 4,972,383 and EP-889,331 filed by the assignee describe a method known as the Interwell® method which allows obtaining an at least two-dimensional model representing the acoustic impedance variations of an underground zone, which best matches known data deduced from observations or measurements: geologic data, post-stack seismic data, or other data obtained in one or more wells drilled through the zone, etc. The Interwell® method comprises construction of an a priori impedance model by combining well data and known structural or stratigraphic data, notably by kriging of the known impedances along the wells by following the correlation surfaces, inside stratigraphic units. The seismic horizons give the geometry of these stratigraphic units and correlations are performed by following the surfaces defined in accordance with the deposition mode (concordant, parallel to the roof or to the floor). The initial impedance distribution among the wells is then updated by taking account of the seismic amplitudes measured. This is achieved iteratively by minimizing a two-term cost function:

$F=Fs+Fg$, where:

Fs is a seismic term defined as a certain norm representative of the difference between the synthetic traces obtained from the model and the amplitudes of the real seismic traces: pre-stack traces, post-stack traces, etc., and Fg is a geologic term measuring the difference between the a priori model and the standard model.

The optimum impedance model is a compromise between the two terms depending on the respective weights thereof. These weights are related to the inversion parameters, that is, for Fs, to the signal-to-noise ratio and, for Fg, to the correlation length $\lambda$ and the variance $\sigma^2$ of the error on the a priori model, assuming that this error is a random variable with a stationary exponential covariance of variance $\sigma^2$ and of correlation length $\lambda$.

The weight of Fs is usually estimated from the real amplitudes. Conversely, correlation length $\lambda$ and standard deviation $\sigma$ are defined by the user according to the degree of confidence the user can have in the a priori model. However, this point should not be assessed too heuristically because the confidence the user can have in the a priori model depends on the quality of the data, on the number and location of the wells, and also on the spatial behavior of the impedance field.

SUMMARY OF THE INVENTION

The method according to the invention allows obtaining, by inversion, an optimized model of a physical quantity representative of a stratified heterogeneous medium (the impedance of this medium in relation to waves propagated therein for example), by means of a more quantitative characterization of inversion parameters (standard deviation and correlation length for example) that is consistent with the structure of the data observed or measured in the medium. By specifying the interdependence of these parameters, the method advantageously guides the interpreter in the selection of the values to be taken into account for the parameters. The resulting model is improved in relation to the model obtained by means of a purely heuristic selection.

The method according to the invention allows modelling the impedance of an underground zone in relation to waves propagated therein, and the obtaining of an image of the subsoil where the discontinuities generating these impedance variations are located more precisely. The invention has an application of facilitating location of hydrocarbon reservoirs.

The method comprises construction of an a priori model from known data obtained by measurements, recordings or observations at a number of points of the medium, and construction of an optimum model by iteratively minimizing a cost function depending on the differences between the model being sought and the known data, considering the a priori model.

The method of the invention constructs the a priori model, the construction comprising a correlation by kriging with a covariance (Cz) between the known values of the physical quantity at different points of the medium along discontinuities (strata directions), the uncertainties about the values of the physical quantity in the a priori model in relation to the corresponding values in the medium, at any point along these directions, following a covariance model (C$\epsilon$) that controls the inversion parameters, the model comprising a stationary covariance term (Cz) depending only on a distance vector ($\vec{h}$) between the points and a non-stationary covariance term depending on the position of the points and on the distances between one another respectively.

According to a first embodiment, a mean covariance ($\overline{C_\epsilon}$) is determined and adjusted to a stationary exponential covariance model (of a well-known type) in order to define the inversion parameters more precisely than with the conventional heuristic method.

According to a second embodiment, the covariance term (C$\epsilon$) is adjusted at all points to a stationary exponential model in order to obtain local values ($\lambda_x$, $\sigma_x$) of the inversion parameters.

BRIEF DESCRIPTION OF THE DRAWINGS

Other features and advantages of the method according to the invention will be clear from reading the description hereafter of an embodiment given by way of non limitative example, with reference to the accompanying drawings wherein.

DETAILED DESCRIPTION OF THE PREFERRED EMBODIMENTS

Since the a priori model is constructed by kriging, the theoretical covariance of the kriging errors that control in principle the weight of the geologic term Fg has been studied. In the case of ordinary kriging, if Z is the impedance field and if $Z_{a\ priori}$ is the kriged impedance field $Z^*$, the error is expressed as follows:

$$\epsilon(X)=Z(x)-Z^*(x).$$

If x and y represent two points of the medium at a distance h from one another, the covariance $C_\epsilon$, (x,y) of the error $\epsilon(x)$ is then expressed as follows:

$$C_\epsilon(x, y)=C_z(\vec{h})-{}'\beta(x)K\beta(x+\vec{h})$$

where K is the kriging matrix, $\beta(x)$ and $\beta(x+\vec{h})$ are the kriging weightings respectively at positions x and y, $\vec{h}$ being the distance vector from x to y, and $'\beta$ the transpose of weighting $\beta$.

The theoretical error covariance $C_\epsilon$, (x,y) between two points x and y appears as the initial kriging covariance $C_z(\vec{h})$ allowing construction of the a priori model, a covariance which is most often isotropic and only depends on distance, modified by a non-stationary term $'\beta(x)K\beta(x+\vec{h})$ depending both on distance and on the position of the points x and y considered. Far away from any well, the initial covariance $C_z(\vec{h})$ predominates whereas the second term becomes more and more important as a well is approached.

Figure 1A:
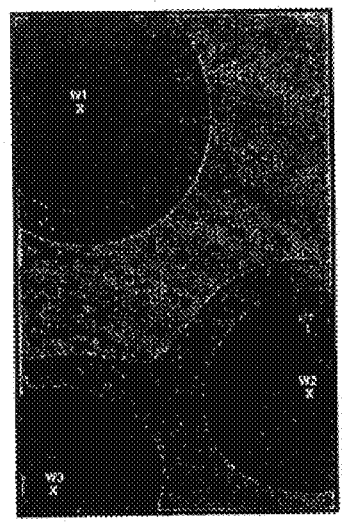
FIGS. 1A and 1B show two covariance grids of the kriging error in a correlation plane around three wells W1, W2, W3, respectively corresponding to two different distance vectors $\vec{h}$, which illustrate the non-stationary nature of the uncertainties covariance.
Figure 1B:
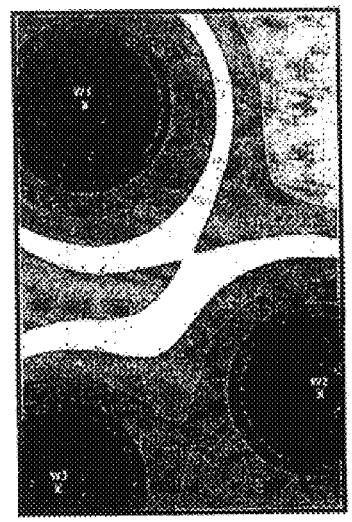
Figure 2:
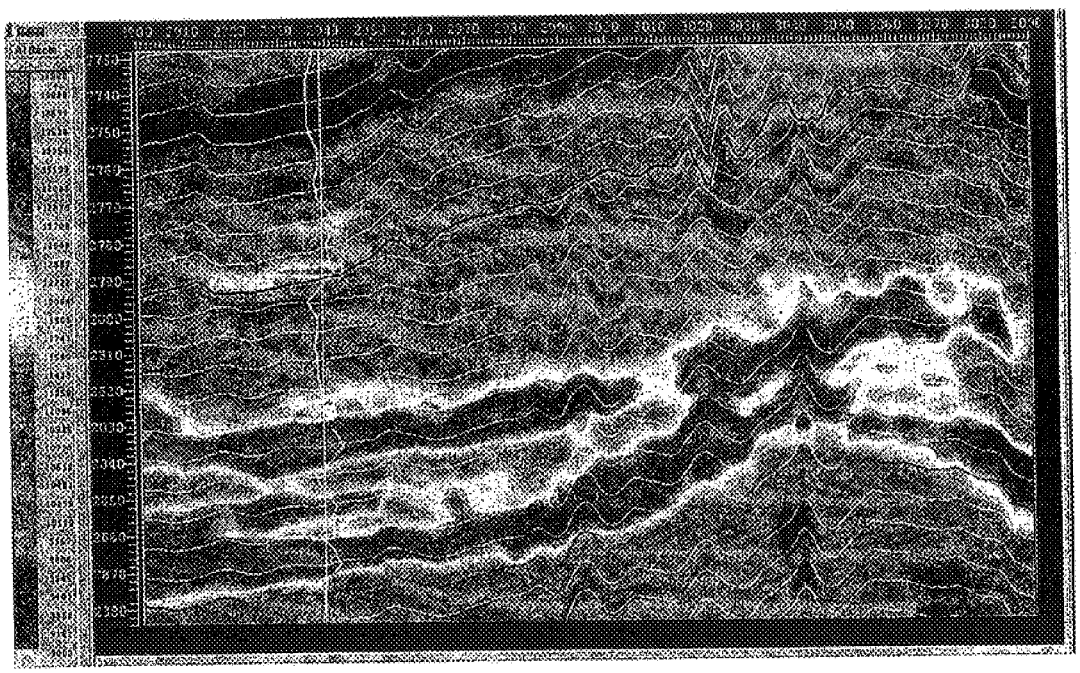
FIG. 2 shows an example of an impedance model obtained with standard inversion parameters.
Figure 3:
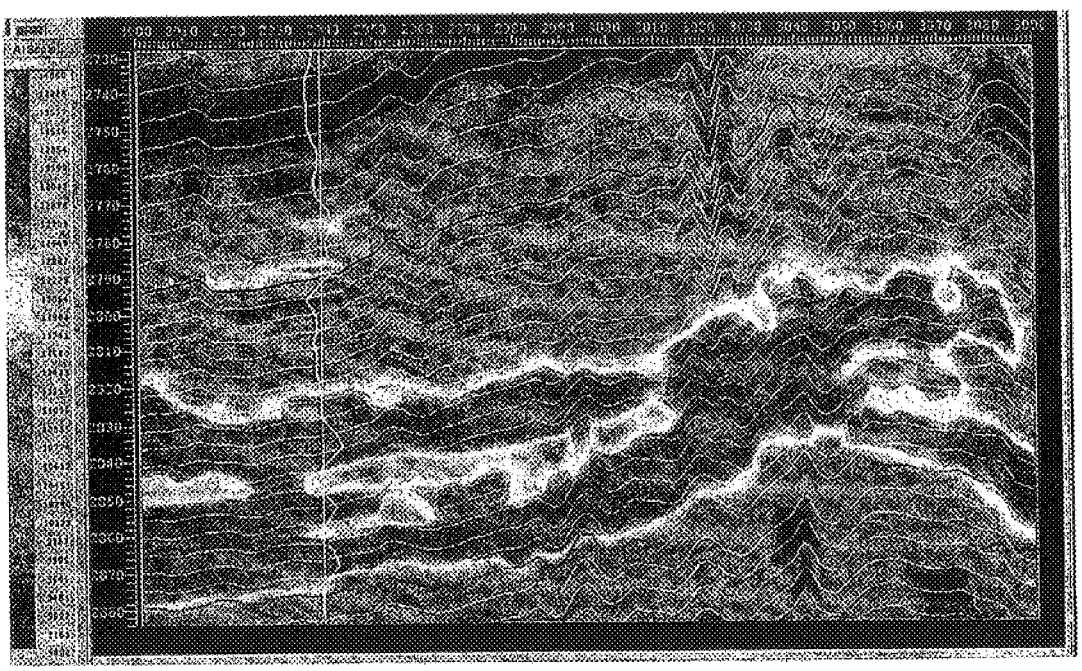
FIG. 3 shows an example of an impedance model obtained by means of the method according to the invention, with inversion parameters that are better adjusted to the behavior of the uncertain covariance.

This behavior is illustrated by an example in a real field with three vertical wells. For the stratigraphic unit of the reservoir, the impedances were kriged along parallel surfaces at the base thereof with a common exponential model (correlation length 750 m, standard deviation on the impedance 1122 g/cm$^3$.m/s). The covariance of the associated errors is calculated for two distance vectors, as can be seen in FIGS. 1A and 1B.

The method comprises selecting inversion parameters quantitatively compatible with the available data integrated in the inversion process. The simplest approach, which requires no inversion algorithm modification, calculates a mean error covariance $$\overline{C}_\epsilon = \int_x\int_y C_\epsilon$$

used for adjusting a stationary exponential covariance (of a known type ) in order to automatically obtain the mean inversion parameters $\lambda=\overline{\lambda}$ and $\sigma=\overline{\sigma}$.

Another approach performs at any point a local adjustment by calculating the suitable corrective term $'\beta(x)K\beta(x+\vec{h})$ for the coordinate position x of this point, which must be added to the stationary term $C_z(\vec{h})$, and in determining the local inversion parameters $\lambda=\lambda_x$, $\sigma=\sigma_x$, by approximating to the local covariance by means of a stationary exponential covariance.

The method thus readily allows the interpreter to use the spatial behavior of the kriging error in order to adjust the weight to be assigned to the geologic term Fg.

In the example described above, the method is applied to model the impedance of a formation in relation to waves propagated therein: elastic waves, electromagnetic waves, etc. It is of course obvious that it can also be applied to model other physical quantities of the formation: porosity, permeability, saturation, etc, or quantities relative to well tests. More generally, the method can be applied to all the Bayesian type inversion models known to those skilled in the art.

What is claimed is:

1. A method for obtaining an optimized model representing an image of a distribution in a subterranean stratified heterogeneous medium of a physical quantity with respect to waves propagating in the medium, comprising:

obtaining data representing values of the physical quantity by means of measurements, recordings or observations at different points of the medium along strata directions;

forming an a priori model by kriging with a stationary covariance between the obtained data representing values of the physical quantity known at points of the medium along the strata directions with uncertainties about the values of the physical quantity in the a priori model at any point along the strata directions being described by a covariance including the stationary covariance that depends only on a distance vector between the points and a non-stationary term depending on a position of the points and on the respective distances between the points;

controlling inversion parameters from characteristics of the covariance including the stationary covariance; and constructing by inversion the optimized model by minimizing a cost function depending on differences between the model being sought and the known data considering the a priori model.

2. A method in accordance with claim 1, wherein:

the physical quantity is impedance of the medium to propagation of the waves.

3. A method in accordance with claim 1, wherein:

the optimized model is used to locate hydrocarbon reservoirs.

4. A method in accordance with claim 3, wherein:

the data comprise seismic data and the medium contains at least one well crossing the medium.

5. A method as claimed in claim 4, comprising defining the inversion parameters to be compatible with an error covariance defined by:

$$C_\epsilon(x, y)=C_z(\vec{h})-{}'\beta(x)K\beta(x+\vec{h})$$

where (x,y) are any two points of the medium at a distance from one another, K is a kriging matrix, $\beta(x)$ and $\beta(x+\vec{h})$ are kriging weights respectively at points x and y and $\vec{h}$ is the distance vector between the two points.

6. A method as claimed in claim 5, comprising determining a mean covariance that is adjusted to a stationary exponential covariance model in order to define the inversion parameters.

7. A method as claimed in claim 5, comprising, at all the points, adjusting the covariance including the stationary covariance to a stationary exponential model in order to define local values of the inversion parameters.

8. A method as claimed in claim 4, comprising determining a mean covariance that is adjusted to a stationary exponential covariance model in order to define the inversion parameters.

9. A method as claimed in claim 4, comprising, at all the points, adjusting the covariance including the stationary covariance to a stationary exponential model in order to define local values of the inversion parameters.

10. A method as claimed in claim 3, comprising defining the inversion parameters to be compatible with an error covariance defined by:

$$C_e(x, y) = C_z(\vec{h}) - {}^t\beta(x) K \beta(x+\vec{h})$$

where (x,y) are any two points of the medium at a distance from one another, K is a kriging matrix, $\beta(x)$ and $\beta(x+\vec{h})$ are kriging weights respectively at points x and y and $\vec{h}$ is the distance vector between the two points.

11. A method as claimed in claim 10, comprising determining a mean covariance that is adjusted to a stationary exponential covariance model in order to define the inversion parameters.

12. A method as claimed in claim 10, comprising, at all the points, adjusting the covariance including the stationary covariance to a stationary exponential model in order to define local values of the inversion parameters.

13. A method as claimed in claim 3, comprising determining a mean covariance that is adjusted to a stationary exponential covariance model in order to define the inversion parameters.

14. A method as claimed in claim 3, comprising, at all the points, adjusting the covariance including the stationary covariance to a stationary exponential model in order to define local values of the inversion parameters.

15. A method in accordance with claim 1, wherein:
the data comprise seismic data and the medium contains at least one well crossing the medium.

16. A method as claimed in claim 9, comprising defining the inversion parameters to be compatible with an error covariance defined by:

$$C_e(x, y) = C_z(\vec{h}) - {}^t\beta(x) K \beta(x+\vec{h})$$

where (x,y) are any two points of the medium at a distance from one another, K is a kriging matrix, $\beta(x)$ and $\beta(x+\vec{h})$ are kriging weights respectively at points x and y and $\vec{h}$ is the distance vector between the two points.

17. A method as claimed in claim 16, comprising determining a mean covariance that is adjusted to a stationary exponential covariance model in order to define the inversion parameters.

18. A method as claimed in claim 16, comprising, at all the points, adjusting the covariance including the stationary covariance to a stationary exponential model in order to define local values of the inversion parameters.

19. A method as claimed in claim 15, comprising determining a mean covariance that is adjusted to a stationary exponential covariance model in order to define the inversion parameters.

20. A method as claimed in claim 15, comprising, at all the points, adjusting the covariance including the stationary covariance to a stationary exponential model in order to define local values of the inversion parameters.

21. A method as claimed in claim 1, comprising defining the inversion parameters to be compatible with an error covariance defined by:

$$C_e(x, y) = C_z(\vec{h}) - {}^t\beta(x) K \beta(x+\vec{h})$$

where (x,y) are any two points of the medium at a distance from one another, K is a kriging matrix, $\beta(x)$ and $\beta(x+\vec{h})$ are kriging weights respectively at points x and y and $\vec{h}$ is the distance vector between the two points.

22. A method as claimed in claim 21, comprising determining a mean covariance that is adjusted to a stationary exponential covariance model in order to define the inversion parameters.

23. A method as claimed in claim 21, comprising, at all the points, adjusting the covariance including the stationary covariance to a stationary exponential model in order to define local values of the inversion parameters.

24. A method as claimed in claim 1, comprising determining a mean covariance that is adjusted to a stationary exponential covariance model in order to define the inversion parameters.

25. A method as claimed in claim 1, comprising, at all the points, adjusting the covariance including the stationary covariance to a stationary exponential model in order to define local values of the inversion parameters.

26. A method in accordance with claim 2, wherein:
the optimized model is used to locate hydrocarbon reservoirs.

27. A method in accordance with claim 26, wherein:
the data comprise seismic data and the medium contains at least one well crossing the medium.

28. A method as claimed in claim 27, comprising defining the inversion parameters to be compatible with an error covariance defined by:

$$C_e(x, y) = C_z(\vec{h}) - {}^t\beta(x) K \beta(x+\vec{h})$$

where (x,y) are any two points of the medium at a distance from one another, K is a kriging matrix, $\beta(x)$ and $\beta(x+\vec{h})$ are kriging weights respectively at points x and y and $\vec{h}$ is the distance vector between the two points.

29. A method as claimed in claim 28, comprising determining a mean covariance that is adjusted to a stationary exponential covariance model in order to define the inversion parameters.

30. A method as claimed in claim 28, comprising, at all the points, adjusting the covariance including the stationary covariance to a stationary exponential model in order to define local values of the inversion parameters.

31. A method as claimed in claim 27, comprising determining a mean covariance that is adjusted to a stationary exponential covariance model in order to define the inversion parameters.

32. A method as claimed in claim 27, comprising, at all the points, adjusting the covariance including the stationary covariance to a stationary exponential model in order to define local values of the inversion parameters.

33. A method as claimed in claim 26, comprising defining the inversion parameters to be compatible with an error covariance defined by:

$$C_e(x, y) = C_z(\vec{h}) - {}^t\beta(x) K \beta(x+\vec{h})$$

where (x,y) are any two points of the medium at a distance from one another, K is a kriging matrix, β(x) and β(x+$\vec{h}$) are kriging weights respectively at points x and y and $\vec{h}$ is the distance vector between the two points.

34. A method as claimed in claim 33, comprising determining a mean covariance that is adjusted to a stationary exponential covariance model in order to define the inversion parameters.

35. A method as claimed in claim 33, comprising, at all the points, adjusting the covariance including the stationary covariance to a stationary exponential model in order to define local values of the inversion parameters.

36. A method as claimed in claim 26, comprising determining a mean covariance that is adjusted to a stationary exponential covariance model in order to define the inversion parameters.

37. A method as claimed in claim 26, comprising, at all the points, adjusting the covariance including the stationary covariance to a stationary exponential model in order to define local values of the inversion parameters.

38. A method in accordance with claim 2, wherein:
    the data comprise seismic data and the medium contains at least one well crossing the medium.

39. A method as claimed in claim 38, comprising defining the inversion parameters to be compatible with an error covariance defined by:

$$C_\epsilon(x, y) = C_z(\vec{h}) - {}^t\beta(x) K \beta(x+\vec{h})$$

where (x,y) are any two points of the medium at a distance from one another, K is a kriging matrix, β(x) and β(x+$\vec{h}$) are kriging weights respectively at points x and y and $\vec{h}$ is the distance vector between the two points.

40. A method as claimed in claim 39, comprising determining a mean covariance that is adjusted to a stationary exponential covariance model in order to define the inversion parameters.

41. A method as claimed in claim 38, comprising, at all the points, adjusting the covariance including the stationary covariance to a stationary exponential model in order to define local values of the inversion parameters.

42. A method as claimed in claim 38, comprising determining a mean covariance that is adjusted to a stationary exponential covariance model in order to define the inversion parameters.

43. A method as claimed in claim 38, comprising, at all the points, adjusting the covariance including the stationary covariance to a stationary exponential model in order to define local values of the inversion parameters.

44. A method as claimed in claim 2, comprising defining the inversion parameters to be compatible with an error covariance defined by:

$$C_\epsilon(x, y) = C_z(\vec{h}) - {}^t\beta(x) K \beta(x+\vec{h})$$

where (x,y) are any two points of the medium at a distance from one another, K is a kriging matrix, β(x) and β(x+$\vec{h}$) are kriging weights respectively at points x and y and $\vec{h}$ is the distance vector between the two points.

45. A method as claimed in claim 44, comprising determining a mean covariance that is adjusted to a stationary exponential covariance model in order to define the inversion parameters.

46. A method as claimed in claim 44, comprising, at all the points, adjusting the covariance including the stationary covariance to a stationary exponential model in order to define local values of the inversion parameters.

47. A method as claimed in claim 2, comprising determining a mean covariance that is adjusted to a stationary exponential covariance model in order to define the inversion parameters.

48. A method as claimed in claim 2, comprising, at all the points, adjusting the covariance including the stationary covariance to a stationary exponential model in order to define local values of the inversion parameters.

49. A method for obtaining an optimized model representing an image of a distribution in a subterranean stratified heterogeneous medium of a physical quantity with respect to waves propagating in the medium, comprising:
    obtaining data representing values of the physical quantity by means of measurements, recordings or observations at different points of the medium along strata directions;
    forming an a priori model by kriging with a stationary covariance between the obtained data representing values of the physical quantity known at points of the medium along the strata directions with uncertainties about the values of the physical quantity in the a priori model at any point along the strata directions being described by a covariance including the stationary covariance that depends only on a distance vector between the points and a non-stationary term depending on a position of the points and on the respective distances between the points;
    controlling inversion parameters from characteristics of the covariance including the stationary covariance; and
    constructing by inversion the optimized model by iteratively minimizing a cost function depending on differences between the model being sought and the known data considering the a priori model.

* * * * *